United States Patent Office 3,023,769
Patented Mar. 6, 1962

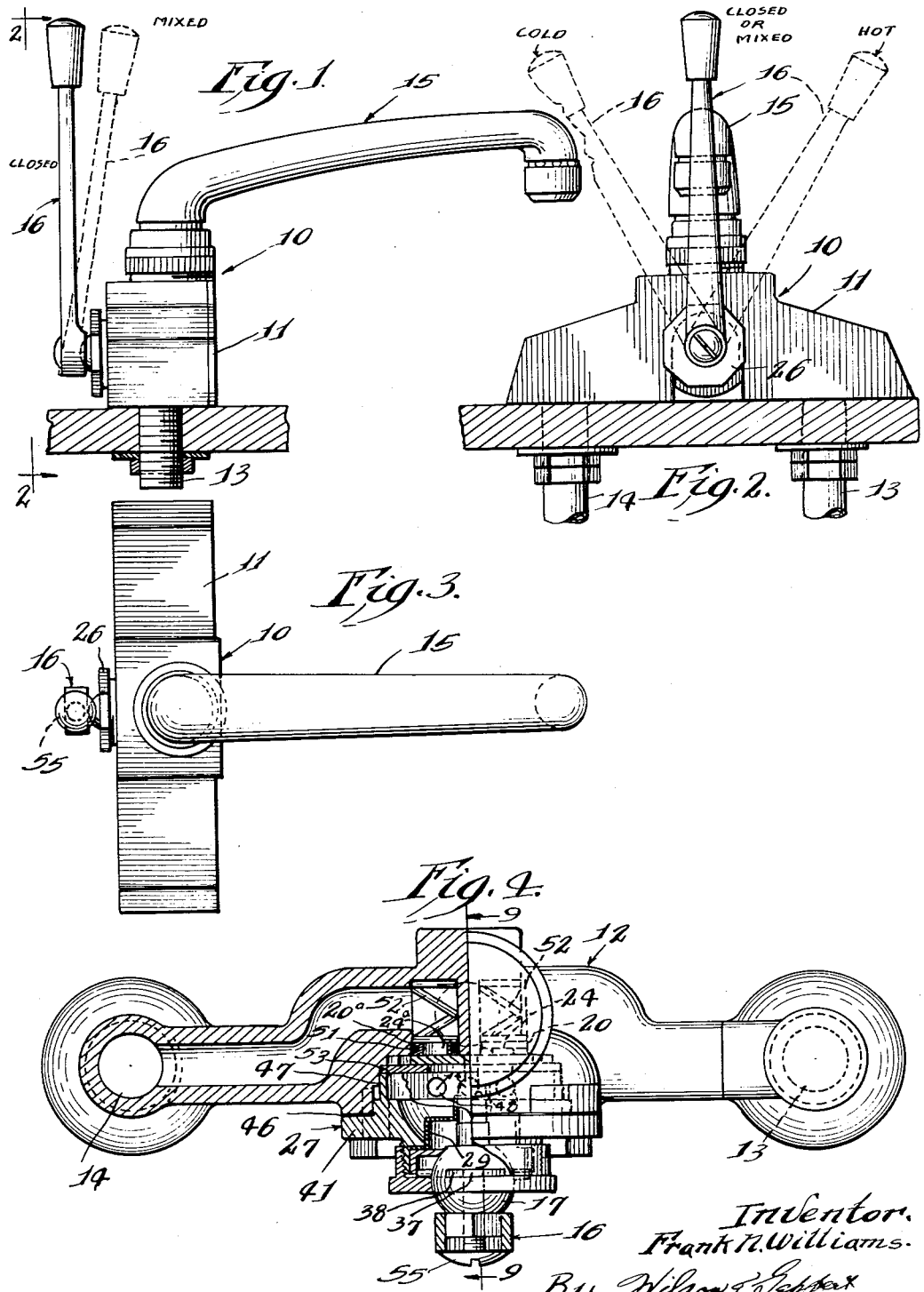

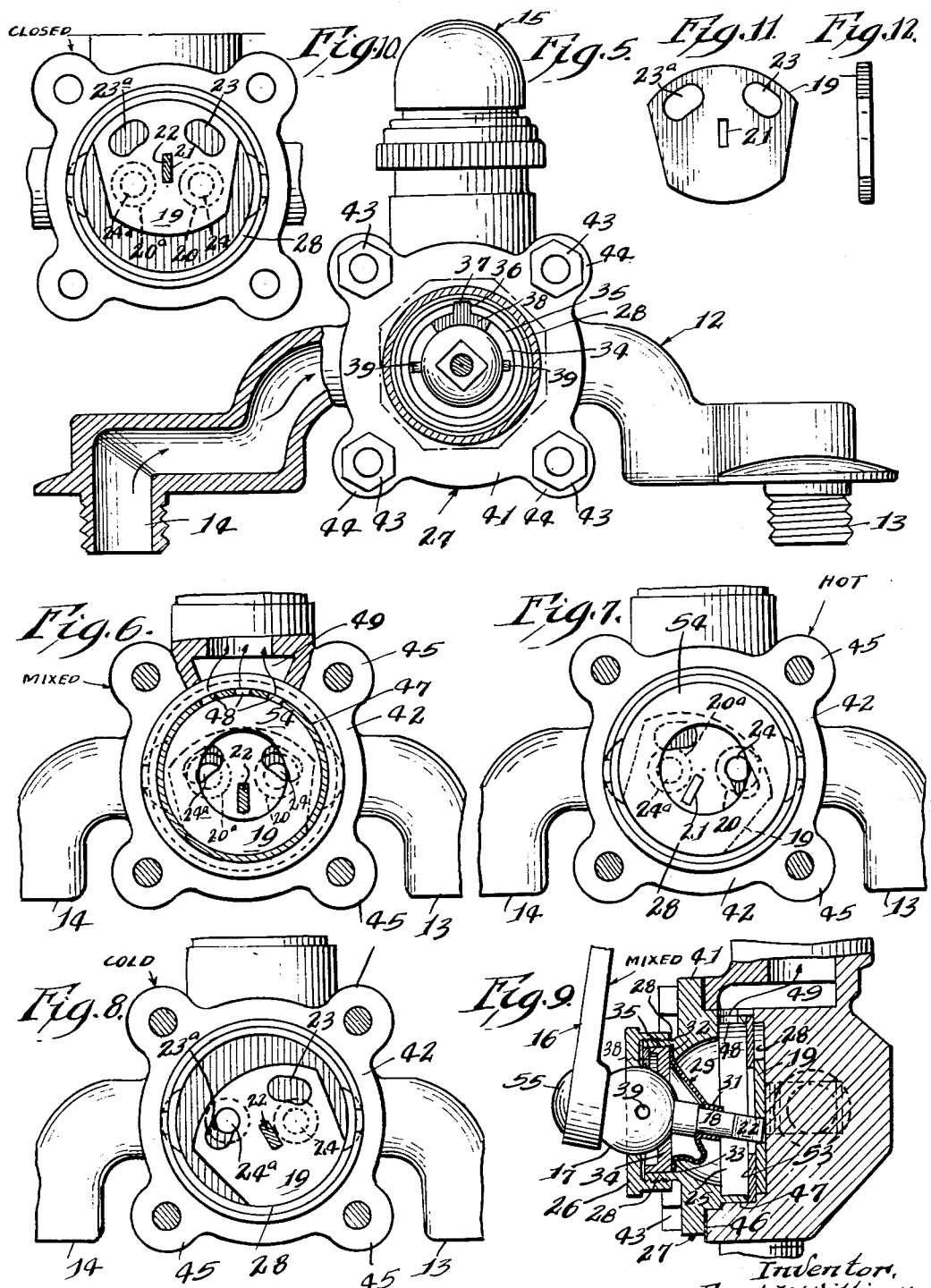

3,023,769
MIXING FAUCETS
Frank N. Williams, Wadsworth, Ill., assignor to Federal-Huber Company, Chicago, Ill., a corporation of Illinois
Filed Dec. 14, 1956, Ser. No. 628,328
4 Claims. (Cl. 137—329.03)

The present invention relates to improvements in mixing faucets and more particularly to a novel valve assembly, including multiple metal valve seats maintained in sealing contact with a ported metal valve member by the pressure of the entering water, and actuating means therefor controlled by the operation of a single handle capable of moving in plural planes.

Another important object of the present invention is the provision of a novel valve assembly for a mixing faucet connected to the cold and hot water inlets and in which the valve member comprises a flat metal plate having spaced ports for the passage therethrough of cold and hot water and movable over spaced metal valve seats removably mounted in bores provided in the valve body and held in a novel manner in sealing contact with the valve member, each valve seat having a port communicating with a water inlet, and means for moving the valve member with one or both of its ports into and out of registry with the communicating ports of the valve seats in such manner as to accurately and positively control the flow of cold and/or hot water and their mixing and discharge in any desired proportions.

The present invention further comprehends the provision of a novel valve assembly having metal-to-metal contact between a ported valve member and adjustable ported valve seats, each of the valve seats being provided with a port communicating with a water inlet and maintained in sealing engagement with the valve member by the pressure of the entering water and said valve seats being spring-biased into sealing contact with the valve member when the pressure is relieved.

Another important object is the provision in the present valve assembly of a novel resilient sealing diaphragm for the valve actuating mechanism of the faucet employing a ball or spherical member without a frictional mounting.

A further important object of the present invention is to provide a novel valve assembly for mixing faucets that eliminates the use of conventional washers or seals for sealing water under pressure, such prior washers or seals being generally of rubber, fiber or a plastic composition and require relatively frequent replacement due to wear or damage incident to their use when sealing water under pressure. Unless promptly replaced when worn or damaged, leakage due to such wear or damage may not only result in a substantial waste of water but also cause damage to the wash basin, sink or bath tub. In addition, the worn or damaged washer or seal by continued use may score or cause excessive wear or damage to the valve seat and this may result in substantial expense for repairs or replacement.

The present invention by reason of its novel construction, arrangement and operation of the valve assembly in which the valve member and its seats are of smooth and relatively hard metal and maintained in intimate sliding and sealing contact by the pressure of the entering water, provides for effective sealing under all operating conditions and pressures encountered in use.

Further objects are to provide a construction of maximum simplicity, efficiency, economy and ease of assembly and operation, and such further objects, advantages and capabilities as will later more fully appear and are inherently possessed thereby.

In the drawings:

FIGURE 1 is a view in side or end elevation of the novel mixing faucet assembly, the handle being shown in full lines in its vertical and rearward or "off" position, and in dotted outline in its forward or "on" mixing position.

FIG. 2 is a view in rear elevation of the faucet assembly, the view being taken on the line 2—2 of FIG. 1 and viewed in the direction of the arrows, the handle being shown in full lines in its vertical or "off" position and when pulled forwardly being disposed in "on" and mixing position, and also being shown in dotted outline at the left in position for effecting full flow of cold water and at the right for effecting full flow of hot water.

FIG. 3 is a top plan view of the faucet assembly.

FIG. 4 is an enlarged view, part in horizontal cross section and part in top plan, of the faucet unit with the outer housing or enclosure removed.

FIG. 5 is an enlarged view in rear elevation of the faucet body of FIG. 4, but with the handle assembly, including its operating shaft and its universal mounting, removed to disclose the internal assembly, the cap nut for the handle assembly being shown in dotted outline.

FIG. 6 is a fragmentary view in rear elevation of the faucet body shown in FIG. 5 but with the end plate or closure, the resilient diaphragm and the supporting parts for the diaphragm having been removed to disclose the retaining washer or annular retaining plate for the movable valve member, this valve member, its ports and communicating ports in the valve seats being shown in dotted outline and in their position for opening both sets of communicating ports when the handle is disposed vertically and in "on" or open position in which a substantially equal quantity or volume of hot and cold water are permitted to flow into the mixing chamber preparatory to discharge.

FIG. 7 is a view similar to FIG. 6 but with the valve member moved to its position for full discharge of hot water.

FIG. 8 is a view similar to FIG. 7, except that the valve member has been moved to its position for full discharge of cold water and the washer or annular plate for retaining the valve member in operative position has been removed.

FIG. 9 is a fragmentary view in vertical cross section through the faucet unit, the view being taken in a plane represented by the line 9—9 of FIG. 4 and viewed in the direction of the arrows, the handle and the valve member being shown in the mixing position of FIG. 6.

FIG. 10 is a fragmentary view in rear elevation similar to FIG. 8, but showing the valve member moved upwardly to its closed or inoperative position when the handle is moved to the full line position of FIG. 1.

FIG. 11 is a view in side elevation of the valve member, and

FIG. 12 is a view in end elevation of the valve member.

Referring more particularly to the disclosure in the drawings in which is shown an illustrative embodiment of the present mixing faucet assembly 10 with its valve unit and actuating and control mechanism, the faucet assembly being shown provided with a housing or enclosing shell 11 that is made removable. The body 12 of the faucet is shown provided with a hot water inlet 13, a cold water inlet 14, a discharge nozzle or spout 15 capable of being rotated to a desired position for discharge, and a handle 16 for controlling the operation of the faucet and the flow of water from the cold and hot water inlets.

The handle 16 is provided with a ball or spherical member 17 and an operating shaft or valve stem 18 projecting therefrom into the faucet body 12 for actuating or moving a valve member 19 in the form of a flat and relatively hard metal plate slidable over spaced valve seats 20 and 20a, the valve having a rectangular slot 21 substantially centrally arranged for receiving the reduced end 22 of the operating shaft 18. The operating shaft or valve stem is adapted to move this valve member to position its spaced substantially elliptically-shaped ports or apertures 23 and 23ª in and out of registry with the ports or passages 24 and 24ª in the valve seats 20 and 20ª, respectively, through which passes the entering hot and cold water from the inlets 13 and 14, respectively. Water entering the mixing chamber 25 in the faucet body 12 flows out through a communicating port opening into the passage of the nozzle or spout 15 to discharge.

The faucet body is provided with a smooth metal surface or wall provided with spaced bores receiving the valve seats 20 and 20ª in the form of a pair of axially-movable collars or rings containing the passages 24 and 24ª for the entering hot and cold water and cover which valve seats the valve member or flat metal plate 19 is movable into its various operative positions. FIG. 6 shows the valve member 19 moved by the handle 16 and its operating shaft 18 to open or "on" position in which the ports 23 and 23ª are both disposed in registry or alignment with the ports or passages 24 and 24ª through which enters the hot and cold water.

Moving the handle to the right as viewed from the rear of the faucet in FIG. 2 and forwardly, moves the valve member 19 to the position shown in FIG. 7 where the hot water port 24 in the valve seat 20 is in full registry or alignment with the hot water port 23 of the valve member, and the cold water port 24ª of the valve seat 20ª is out of registry or alignment with the cold water port 23ª of the valve member 19.

In FIG. 8, the valve member 19 has been moved by the handle 16 to the position in which the hot water port 23 of the valve member is out of registry with its hot water port 24 in the valve seat 20 and the cold water port 23ª of the valve member has been moved into full registry with the cold water port 24ª of the valve seat 20ª so that only cold water enters the chamber 25 in the faucet body. This is accomplished when the handle 16 is moved to the left as viewed from the rear of the faucet as in FIG. 2, and forwardly.

With the handle 16 in the intermediate or vertical position shown in FIG. 2, if the handle is pulled forwardly to the dotted line position shown in FIG. 1 and the full line position shown in FIG. 9, the valve member 19 is moved to the mixing position in which this valve member is located in its lowered, open or "on" position as shown in FIG. 6. However, when the handle in this vertical position is moved rearwardly to the full line position shown in FIGS. 1 and 2, the valve member 19 is elevated to the position shown in FIG. 10 in which both the hot and cold water ports 23 and 23ª of the valve member are moved out of registry with the hot and cold water ports 24 and 24ª of the valve seats 20 and 20ª, respectively, in the faucet body 12. In the open position of FIG. 6 a substantially equal quantity or volume of hot and cold water flows into the mixing chamber 25.

The handle 16 is capable of being pulled forwardly in any of the three positions shown in FIG. 2 for the full discharge of hot water, cold water or a mixture thereof, or to any intermediate position whereby the volume and temperature of the water may be quickly adjusted. In any of such discharge positions, to shut off the flow of water all that is required is for the operator to move the handle 16 rearwardly whereby the valve member 19 is elevated and moved out of position in which its ports 23 and 23ª are moved out of registry with the ports 24 and 24ª in the valve seats 20 and 20ª.

To mount the operating shaft or valve stem 18 and its ball or spherical member 17 for rotation or universal movement, there is provided a cap nut 26 and an end plate or closure 27, the end plate 27 provided with an externally threaded hub 28 receiving a cupped, resilient diaphragm 29 of natural or compounded synthetic rubber having an opening and collar 31 to conformably receive and seal about the circumference of the operating shaft or valve stem 18, with the flanged periphery 32 of this diaphragm anchored between an internal, annular flange 33 on the end plate and an internal annular flange 34 provided in a collar 35 conformably received in the hub 28. The annular flange 34 of the collar is contoured to conformably receive and provide a seat for the ball or spherical member 17. By providing the sealing diaphragm 29, a tight frictional seal between the ball 17 and its seat is eliminated.

The hub 28 of the end plate 27 and the collar 35 are notched at 36 (FIG. 5) to receive a projection 37 on an arcuate insert 38 which, when assembled, rests upon the flange 34 of the collar 35 with its projection 37 resting in the aligned notches 36 in the collar 35 and hub 28. This insert 38 which locates and retains the collar 35 against rotation has the function of limiting the pivotal movement of the ball or spherical member 17 and the handle 16 to the dotted line lateral positions of the handle as shown in FIG. 2. This is accomplished by providing the ball 17 with a pin 39 (FIGS. 5 and 9) projecting therethrough, the opposite ends of the pin projecting beyond the spherical surface of the ball and into position to engage an end of the insert 38 which thus forms a stop or abutment.

The end plate or closure 27 is provided with an external flange 41 adapted to be rigidly connected to a similarly contoured flange 42 on the faucet body 12 by means of lock nuts 43 projecting through openings in spaced ears 44 on the end plate 27 and into tapped openings in similarly arranged and spaced ears 45 on the faucet body, and sealed by a gasket or washer 46. This end plate 27 is also provided with an annular cylindrical flange 47 projecting into and conformably received in the faucet body 12 and provided with spaced openings or apertures at 48 (FIGS. 6 and 9) for the passage of the entering hot and cold water to an aligned discharge passage 49 in the faucet body communicating with the nozzle or spout 15.

As shown in FIG. 4, the hot water port 24 and the cold water port 24ª are each provided in a valve seat 20 and 20ª, respectively, the valve seats each carrying an O-ring 51 for sealing contact with the internal wall of a bore in the faucet body 12. A compression spring 52 is provided for spring-biasing each valve seat 20 and 20ª in the faucet body with the outer smooth surface of these seats having wiping and sealing contact with the adjacent flat and smooth surface on the inner face of the valve member or flat metal plate 19. A flat annular metal plate 54 seats against the outer face of the valve member 19 and is held in contact therewith by the adjacent inner end or circumferential edge of the inner flange 47 on the end plate or closure 27 seating against the perimeter 53 of the plate 54 when the component parts are assembled and the lock nuts 43 are drawn tight. The handle 16 is shown as detachably mounted to the outer end of the operating shaft or valve stem 18 by a set screw 55.

The compression spring 52 is of such strength as to maintain the valve seats 20 and 20ª in sealing contact with the valve member 19 in the event the water pressure is relieved, but at other times the water pressure effectively retains these valve seats in tight sealing engagement with the valve member for these valve seats are provided in the pressure side of the faucet. Therefore, it will be evident that these novel valve seats and the manner in which they form a sealing contact with the valve member are not limited to use in a mixing faucet but may be employed in a single faucet unit for controlling the flow of cold or hot water.

As the valve seats 20 and 20ª are interchangeable and these valve seats and the valve member 19 are reversible since the opposite faces thereof are identical, it will be seen that even though the contacting or sealing face of any of these parts should become worn, it is a simple matter to reverse the position of the worn part and thus prolong the life of the valve assembly.

Having thus disclosed the invention, I claim:

1. In a mixing faucet, a valve body having an inlet for cold water, an inlet for hot water, a cylindrical bore having a smooth flat surface forming an internal wall of said valve body, a pair of spaced valve seats each located in a bore in said internal wall of said valve body and each valve seat having an encompassing sealing ring and a port communicating with one of said inlets, a valve member consisting of a flat metal plate having opposite parallel smooth faces and of substantially less area than said internal wall and having one face in sealing contact with the adjacent face of said valve seats with the said valve seats maintained in fluid sealing contact with the valve member by the pressure of the entering water, means for spring-biasing said valve seats in sealing contact with said valve member when water pressure behind said valve seats is relieved, said valve member having its opposite ends rounded in substantial conformity with the internal contour of the wall defining said cylindrical bore and provided with a central slot and spaced cold and hot water ports adjacent the upper end of said valve plate, a fixed annular flat plate having frictional contact with and locating and retaining said valve member in contact with said valve seats, a closure for said valve body having a part locating and retaining said annular plate in the valve body, a mixing chamber for the entering water provided within the valve body between said annular plate and said closure, a universal mounting in the closure, a handle attached to the mounting, a shaft affixed at one end to the mounting and its other end projecting through the mixing chamber and annular plate and into the slot in the valve plate, and means in said mounting to limit the arc of rotation of said mounting whereby said valve plate through actuation of said handle has linear movement, and also rotary movement at any given point of the linear movement of said valve plate, rotary movement when said valve plate is in its uppermost position producing no uncovering of the valve ports and hence no liquid flow, and when said plate is at any other position, linear or rotary movement of said valve plate moves said spaced ports therein to wholly or partially cover or uncover one or both ports of said valve seats for the passage through the faucet of cold water, hot water or a mixture in any desired volume and in mixing position varies the temperature of the discharge.

2. In a mixing faucet as set forth in claim 1, in which said valve seats include a collar having spaced circumferentially arranged flanges defining an annular outwardly opening groove and an O-ring in said groove, said valve seats being reversible to facilitate their assembly and when damaged or scored their position may be reversed for continued successful operation.

3. In a mixing faucet as set forth in claim 1, including a resilient flexible diaphragm having a central opening to sealingly accommodate said shaft, the periphery of said diaphragm being secured to said closure to seal said universal mounting from said mixing chamber.

4. In a mixture faucet as set forth in claim 1, in which said means limiting the arc of rotation of said mounting includes a pin extending through said universal mounting and projecting from opposite sides thereof and an abutment in said closure limiting movement of said mounting when engaged by an end of said pin.

References Cited in the file of this patent

UNITED STATES PATENTS

| | | |
|---|---|---|
| 1,071,466 | Ross | Aug. 26, 1913 |
| 1,120,975 | Roderick | Dec. 15, 1914 |
| 1,427,606 | Leahy | Aug. 29, 1922 |
| 1,790,168 | Paul | Jan. 27, 1931 |
| 2,377,473 | Wolcott | June 5, 1945 |
| 2,503,881 | Manis | Apr. 11, 1950 |
| 2,743,738 | Johnson | May 1, 1956 |
| 2,757,688 | Klingler | Aug. 7, 1956 |
| 2,767,730 | Laird | Oct. 23, 1956 |